United States Patent [19]

Soden et al.

[11] Patent Number: 4,591,747

[45] Date of Patent: May 27, 1986

[54] GROMMET UNIT AND MOTOR HAVING SUCH A UNIT

[75] Inventors: George B. Soden, Wolcott; Gerald J. Miller, Prospect, both of Conn.

[73] Assignee: North American Philips Corporation, New York, N.Y.

[21] Appl. No.: 758,575

[22] Filed: Jul. 24, 1985

Related U.S. Application Data

[63] Continuation of Ser. No. 702,436, Feb. 19, 1985, abandoned, which is a continuation of Ser. No. 453,376, Dec. 27, 1982, abandoned.

[51] Int. Cl.⁴ .................... H02K 5/22; H01B 17/26
[52] U.S. Cl. ........................................ 310/71; 16/2; 174/153 G
[58] Field of Search ........... 174/40 CC, 65 G, 152 G, 174/153 G, 154, 155, 175; 16/2; 24/129 D, 130, 336, 339, 545, 546, 547, 563; 248/56; 310/71

[56] References Cited

U.S. PATENT DOCUMENTS

| | | | |
|---|---|---|---|
| 2,953,625 | 9/1960 | Hasselhorn | 174/65 G X |
| 3,087,009 | 4/1963 | Blanchet | 174/155 X |
| 4,407,472 | 10/1983 | Beck | 24/339 X |

FOREIGN PATENT DOCUMENTS 201688 1/1959 Austria .................... 174/65 G

Primary Examiner—Laramie E. Askin
Attorney, Agent, or Firm—David R. Treacy

[57] ABSTRACT

A motor having two inner field cups in which the stator coils are placed, and outer cups which fit over the inner cups. The coil lead wires pass out through U-shaped openings in the inner and outer field cups, and are protected by an elongated grommet having first and second wire protecting portions which fit in respective openings. These portions are generally U-shaped when not constrained by external forces and are joined by an elongated center section. The grommet is manufactured of a flexible material to permit deformation of the legs of these portions upon pressing of the outer cups into place, to close around the wires.

4 Claims, 4 Drawing Figures

GROMMET UNIT AND MOTOR HAVING SUCH A UNIT

This is a continuation of application Ser. No. 702,436, filed Feb. 19, 1985, now abandoned, which in turn is a continuation of Ser. No. 453,376 filed Dec. 27, 1982, now abandoned.

BACKGROUND OF THE INVENTION

The invention relates to the protection of electrical wires passing through an opening, for example by the use of grommets, and in particular to grommets suitable for use in small electric motors. While having particular application to stepping motors having two coil assemblies, and still more particularly to those with inner field cup assembly and two outer field cups, the invention also has application to other apparatus.

It is conventional to use two axially adjacent stator coils which are disposed in a central stator portion formed by two inner field cups, the inner field cups and coils then constituting an inner field cup assembly. Two outer field cups or corners nest around the axial extremeties of the inner field cup assembly. The wires leading from the stator coils pass through aligned wire openings in the inner field cup assembly and the outer field cups. Ordinarily a first grommet is threaded around the wires leading from one of the coils and protects the wires as they pass sequentially through the opening in the inner field cup assembly and the opening in the outer field cup aligned with that particular coil. The wires from the other coil are threaded through a second grommet and that grommet is installed in the other outer field cup and the portion of the inner field cup assembly associated with the second coil.

Difficulties are experienced in some cases because one or both of the discrete grommets may not seat properly in the outer field cup or inner field cup. This may not become apparent until after the outer field cup has been pressed in place. The separation of the outer field cup after it has been pressed into place is difficult and time consuming.

SUMMARY OF THE INVENTION

It is another object of the invention to provide a grommet construction which will be easier to install.

It is another object of the invention to provide apparatus such as an electric motor which will not require the threading of wires through a circular grommet.

Still another object of the invention is to provide a stepping motor or the like which permits the pressing of the outer cups into place after the grommet has already been positioned on the inner cup assembly.

Still another object of the invention is to provide a motor construction which will require less time to assemble than with grommet constructions that have been used generally.

These and other objects of the invention may be attained through use of an elongated grommet unit having first and second wire protecting portions. The first and second wire protecting portions are generally U-shaped when not constrained by external forces, and are joined by an elongated center section. At least the legs of the U-shaped wire protecting portions are manufactured of a flexible material to permit deformation of the legs upon the application of external forces, for example by a field cup or cover.

In some forms of apparatus according to the invention the grommet is manufactured as a one-piece unitary article; that is, it is all of the same material. The grommet may include ears extending from the sides thereof at one or both wire protecting portions for retaining the grommet. The U-shaped protecting portions each include first and second leg portions which may converge inwardly whereby the legs are readily deformed so that their ends or tips move further toward each other responsive to installation of a cover having a flat-bottomed U-shaped slot.

BRIEF DESCRIPTION OF THE DRAWING

The invention will be better understood by reference to the accompanying drawing in which.

DESCRIPTION OF THE PREFERRED EMBODIMENT

Figure 4:
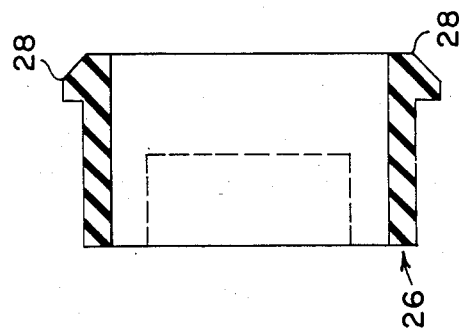
FIG. 4 is a sectional view taken along the line IV—IV of FIG. 3 which illustrates the mounting ears in greater detail.
Figure 2:
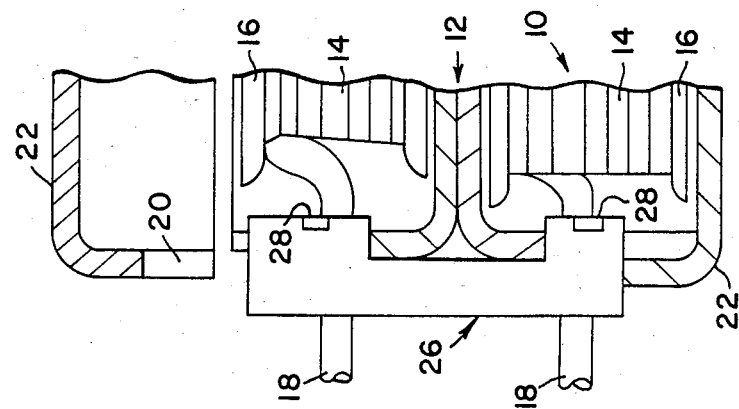
FIG. 2 is a broken-away sectional view taken along the line II—II of FIG. 1.

Referring now to FIGS. 1-4 there is shown a motor 10 having an inner field cup assembly 12 which includes first and second coils 14, 14 carried on bobbins 16, 16. The coils 14, 14 each have a pair of wires 18, 18 extending therefrom which pass through wiring openings in the inner field cup assembly 12 which open outwardly in opposite axial directions as well as flat-bottomed U-shaped openings 20 in the respective outer cups or covers 22, 22.

Figure 1:
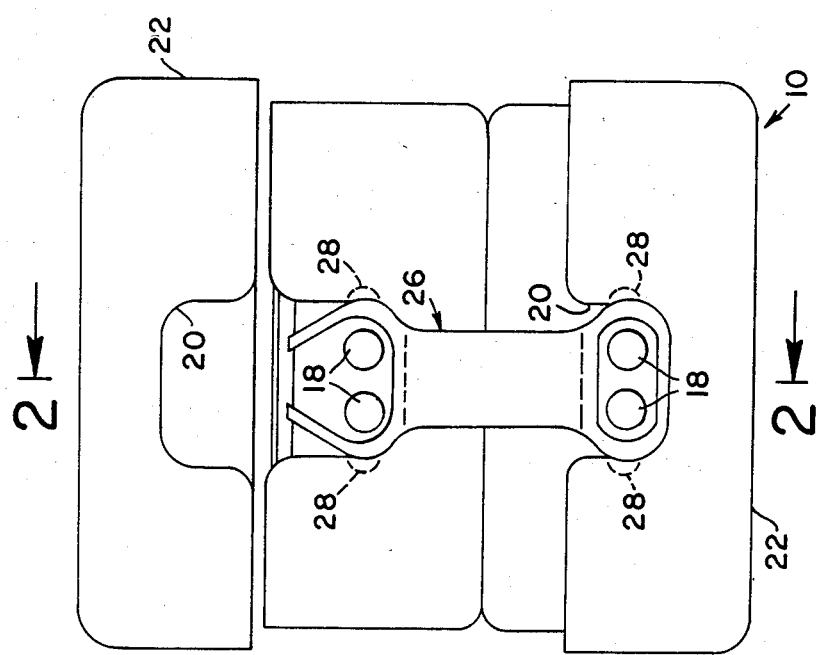
FIG. 1 is an elevational view of an electric motor in accordance with the invention in partially exploded relation showing the manner of installation of the grommet.

The motor 10 is assembled by aligning the cups with the flat-bottomed U-shaped openings 20 facing and aligned with each other, and pressing the outer field cups 22 onto the inner field cup assembly 12. In FIG. 1 the lower cup is shown in the installed portion. Conventionally, discrete grommets (not shown) are threaded onto the respective pairs of wires 18, 18 and inserted into the inner cup assembly 12 prior to pressing of the outer field cup 22 onto the inner cup assembly 12. In some cases the discrete grommet will not be properly positioned and it will be necessary to pry the outer field cup 22 off the inner cup assembly 12 to reposition the grommet. This is a time consuming operation. Occasionally grommets may not be installed properly and it will not be apparent. This may permit the motor to fail because of abrasion of the wires 18.

In accordance with the invention a single elongated grommet unit 26 is provided having first and second wire protecting portions which are each generally U-shaped. These portions are joined by a web-shaped center section which as will be seen from FIGS. 2 and 4 has a thickness which is less than that of the protecting portions. Each wire protecting portion projects in the same thickness direction with respect to the center section, so as to project through the openings 20. The protecting portions are provided with ears 28 which engage the inner face of the inner field cup assembly 12.

Figure 3:
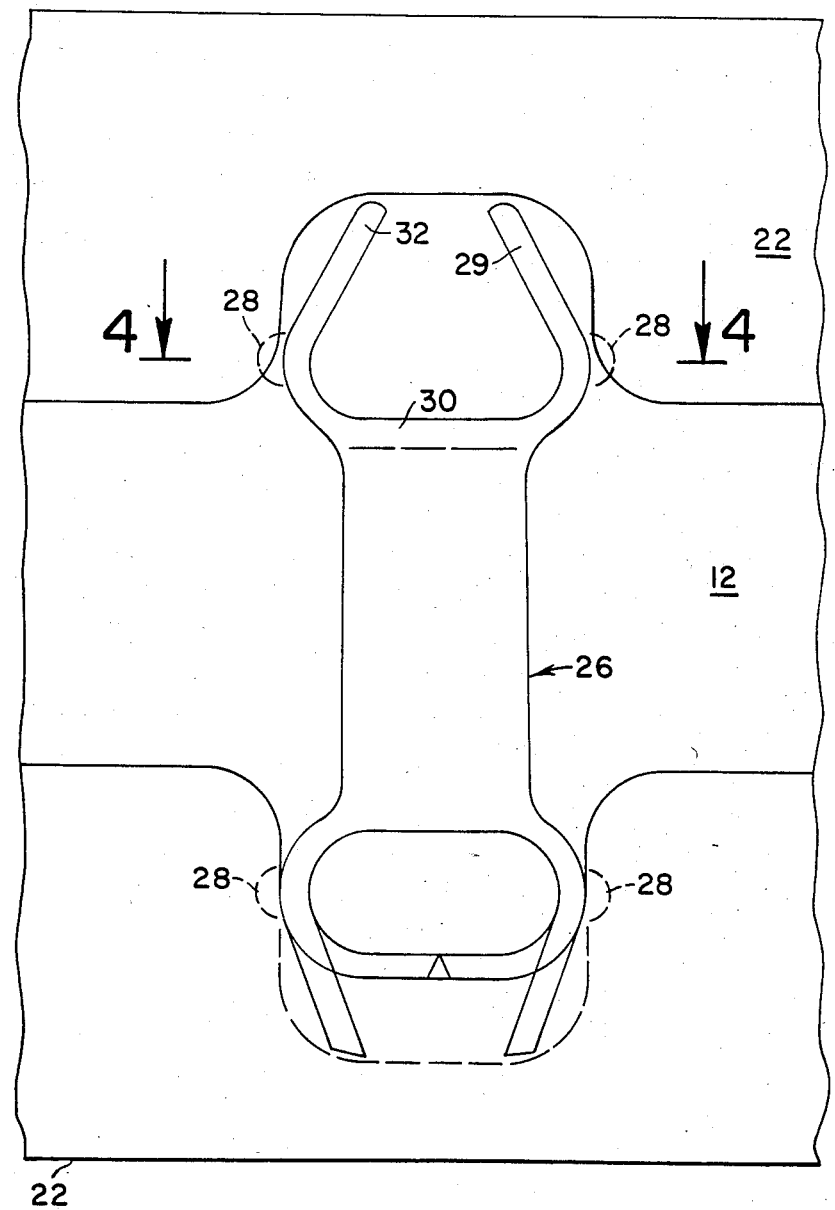
FIG. 3 is a plan view of the grommet in accordance with the invention showing the construction thereof in greater detail.

Ordinarily the entire grommet 26 will be manufactured of a single material and this material will be at least flexible if not elastic. The legs 29 of the grommet 26 ordinarily will converge toward each other, from the bottom part 30 of the wire protecting portion to the tips 32 of the legs, as best seen in FIGS. 1 and 3.

Assembly of a motor in accordance with the invention is accomplished by positioning the grommet 26 into the openings in the inner field cup assembly 12. There is no necessity to thread the grommet 26 onto the wires 18 since the tips 32 of the legs 29 of the U-shaped wiring protecting portions are spaced apart initially (as shown in FIG. 3 and also at the upper axial extremity of the grommet 26 in FIG. 10. Thereafter the respective outer field cups 22, 22 are pressed into place to an installed condition with the flat-bottomed openings 20 registered with respect to the grommet 26, wires 18 and the opening in the inner field cup 12. The structure of the grommet 26 with the converging legs of the U-shaped wire protecting portion causes the legs to deform and bend over the form substantially a closed loop, as best seen at the lower (as shown) axial extremity of the grommet 26 in FIG. 1.

It will thus be seen that the invention allows for the rapid assembly of motors in a manner which ensures that the grommets are precisely positioned so as to avoid damage either during assembly or thereafter.

What is claimed is:

1. A grommet unit for protecting at least two pairs of wires, for use with apparatus having two U-shaped wiring openings, each open outwardly in an opposite axial direction, and two apparatus covers each having a flat-bottomed U-shaped opening, in an installed condition said cover openings being open toward each other and aligned in the axial direction, said unit comprising:

a center section having first and second ends defining an axial direction between said ends, and first and second wire protecting portions each extending from a respective end, each wire protecting portion comprising a bottom part and two legs, said legs being spaced from each other in a width direction transverse to said axial direction and each extending outwardly from said bottom portion to a respective tip; and, in a thickness direction transverse to said axial and width directions, each wire protecting portion having a given thickness, and said center section having a thickness less than said given thickness arranged such that each wire protecting portion projects in a same thickness direction with respect to the center section, at least said legs being made of a flexible material and, in an undeformed condition, the legs of a respective wire protecting portion converging toward each other from the bottom part to the respective tips, whereby upon placement of each of the wire protecting portions into a respective U-shaped wiring opening of said apparatus, a respective pair of wires for the apparatus can be passed between the leg tips of each wire protecting portion and placed adjacent the respective bottom part, and upon movement of respective covers into installed conditions opposite each other, the flat-bottomed cover openings will engage the respective leg tips and deform the legs of each wire protecting portion toward each other such that each leg is bent around a respective wire to provide protection against abrasion by the cover.

2. A grommet unit as claimed in claim 1, characterized in that said legs have lengths selected such that, when the legs are bent toward each other to a position where they lie transverse to said axial direction, the tips of the legs of a respective wire protecting portion abut each other.

3. A grommet unit as claimed in claim 1, characterized in that said legs, bottom parts and center section are a one-piece unitary element formed of a flexible material.

4. An electric motor comprising:

a central stator portion defining an axial direction, having first and second U-shaped openings aligned axially with the open ends of the openings pointing away from each other, two stator coils arranged within the stator portion, each having two wires passing radially outward through a respective one of said U-shaped openings, two covers, each having a flat-bottomed U-shaped opening, said flat-bottomed U-shaped openings being open toward each other and aligned with a respective stator portion opening, and a grommet unit comprising a center section having first and second ends defining an axial direction between said ends, and first and second wire protecting portions each extending from a respective end, each wire protecting portion comprising a bottom part and two legs, said legs being spaced from each other in a direction transverse to said axial direction and each extending outwardly from said bottom portion to a respective tip, at least said legs being made of a flexible material and, in an undeformed condition, the legs of a respective wire protecting portion converging toward each other from the bottom part to the respective tips; said wire protecting portions being seated in respective stator portion openings and said legs being deformed by engagement with respective flat bottoms of said cover openings such that each of said legs is bent around a respective wire and protects it from abrasion against the bottom of the cover opening.

* * * * *